Hector R. Durocher
*INVENTOR*

Hector R. Durocher
INVENTOR

United States Patent Office 3,120,415
Patented Feb. 4, 1964

3,120,415

CONNECTOR FOR FLEXIBLE CABLE

Hector R. Durocher, Nashua, N.H., assignor to Sanders Associates, Inc., Nashua, N.H., a corporation of Delaware Filed June 1, 1959, Ser. No. 817,286
6 Claims. (Cl. 339—17)

The present invention relates to connectors for electrical circuits and more particularly to such connectors which facilitate the interconnection of flexible printed circuit cables to electric devices having extending terminal prongs.

The present trend toward the miniaturization of electronic equipment has amplified the problems associated with the provision of reliable connections between electric components. The process of miniaturization has of necessity created electronic components having high terminal densities, hence connection to such components are extremely difficult to provide and, at the same time, retain the important feature of removability. Consistent with this trend toward economy in weight and space is the increased acceptance of flexible printed circuit cables. A preferred form of printed circuit cable has a flat form factor and thin, planar conductors. Such a cable construction, however, is not well suited for use with conventional wire connectors since the thin, flat conductors are not structurally self-supporting when stripped of insulation. This deficiency of the foil-type conductors has in many cases necessitated painstaking direct hookup of the conductor to various devices where the use of a connector would be highly desirable.

It is, therefore, an object of the present invention to provide an improved electrical connector.

It is a further object of this invention to provide an improved connector for coupling printed circuit cables to electrical devices having extending terminal prongs.

An additional object of the present invention is to provide an improved printed circuit cable connector which is readily removable.

In accordance with the present invention there is provided an electrical female connector. The connector includes an elongated conductor having a looped-shaped conductive terminal connected thereto. The terminal has at least two separate areas of contact to the conductor. Engaging means surround opposite edges of the conductor and are mechanically engaged thereto. Means, including a portion of the loop, are adapted for receiving a male connector when inserted within the terminal loop.

For a better understanding of the present invention together with other and further objects thereof reference is made to the following description taken in connection with the accompanying drawings and its scope will be pointed out in the appended claims.

Figures 1, 2:
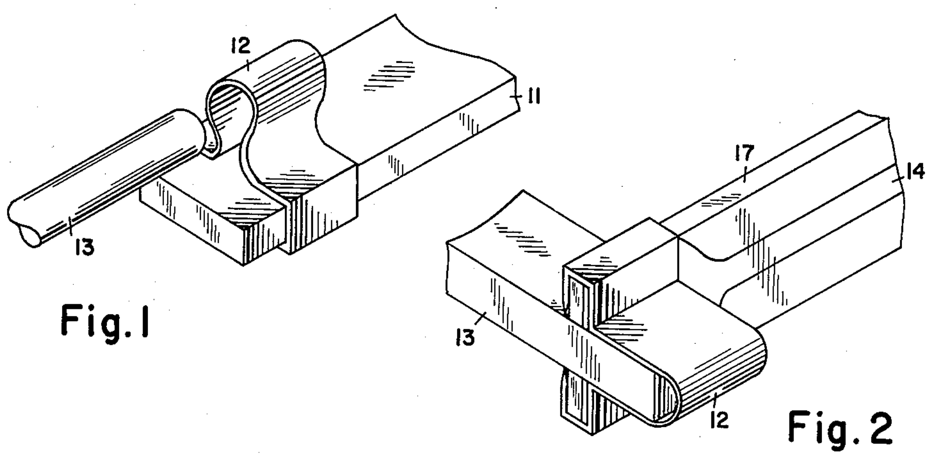
FIG. 1 is a perspective view of an embodiment of the electrical connector of the present invention.
FIG. 2 is a perspective view illustrating another aspect of the embodiment in FIG. 1.

Referring now to the drawings and with particular reference to FIG. 1 there is here illustrated an elongated, planar conductor 11 having a looped-shaped conductive terminal 12 clinched thereto. In this embodiment a portion of the loop of the conductive terminal 12 is adapted for receiving the male connector or probe 13 when it is axially inserted therein. As will be described more fully in connection with FIG. 4, the method of attaching the loop-shaped terminal 12 to the conductor 11 comprises forming a strip of conductive metallic sheet stock into a loop with legs extending from the open end of the loop. The legs are spaced apart a distance approximately equal to or slightly greater than the width of the conductor 11 to which the terminal 12 will be attached. The terminal 12 is then placed onto the conductor 11 with the legs straddling the conductor 11 and extending perpendicularly through and beyond the plane of the conductor 11. Attachment is then completed by turning the leg portions extending beyond the plane of the conductor 11 in toward each other and clinching them to the conductor 11 to secure the terminal 12 permanently in position.

Figure 3:
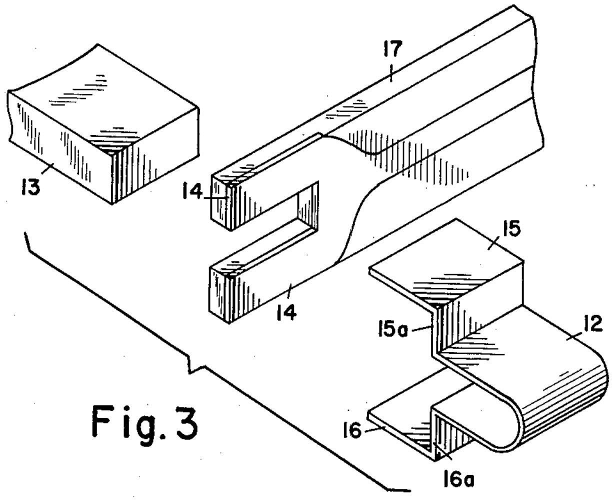
FIG. 3 is an exploded view of the embodiment of FIG. 2.

Illustrated in FIGS. 2 and 3 is a different aspect of the embodiment of FIG. 1. In this latter aspect the terminal 12 is adapted perpendicularly to receive the male connector 13. In this aspect the terminal 12 is clinched around an elongated bifurcated conductor 14, which is adapted for receiving the male connector 13 between its branches. The exploded view of FIG. 3 illustrates more clearly the construction of this connector arrangement. Here it may be seen that the terminal 12 is equipped with engaging means such as the clamping legs 15 and 16 for clinching the terminal 12 to the branches of the bifurcated conductor 14. The insulation 17 of the conductor 14 is removed from the surface of the branched end in order to provide areas of electrical contact between the surfaces 15*a* and 16*a*, of the legs 15 and 16, and the exposed surface of the branches of the conductor 14.

Figure 4:
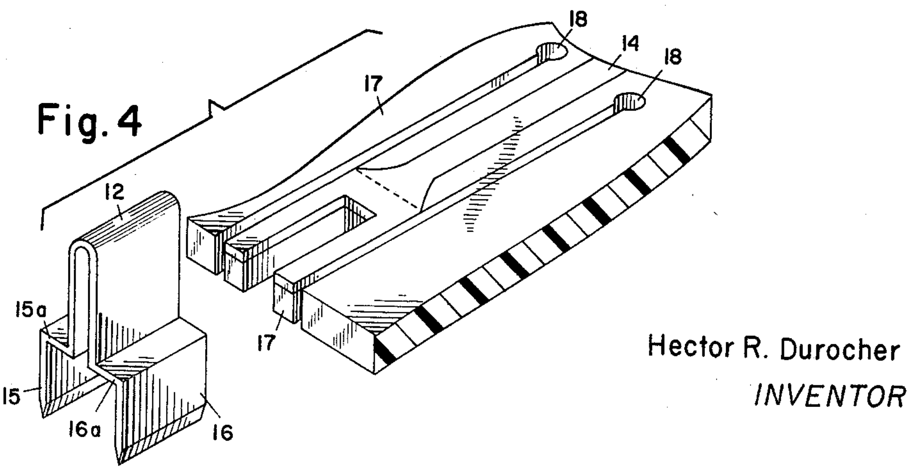
FIG. 4 is a perspective view in detail of the embodiment of FIG. 2 illustrating its method of assembly.

In FIG. 4 there is illustrated in detail the manner of attachment of the terminal 12 to the bifurcated conductor 14. Here it may be seen that the insulation 17 is removed from the conductor 14 in the area between the ends of conductor branches and the dotted line. The insulation is left intact to the sides and below the conductor. The insulation below the conductor ends is useful in providing a deformable base for the conductor 14 to assure continuous and secure contact between the conductor 14 and the areas 15*a* and 16*a* of the terminal 12. The insulation to the sides of the conductor 14 may be pre-cut to receive the terminal 12 as shown and if this is done, it is desirable to provide the strain relief holes 18 to prevent further tearing of the insulation. In the alternative, terminal 12 may be provided with chiseled edges at the ends of legs 15 and 16 so that it can be punched through the insulation 17 to obviate the pre-cutting operation. This would permit the application of the terminal 12 by means of a machine similar in design to the conventional office stapler.

Figures 5, 6, 7:
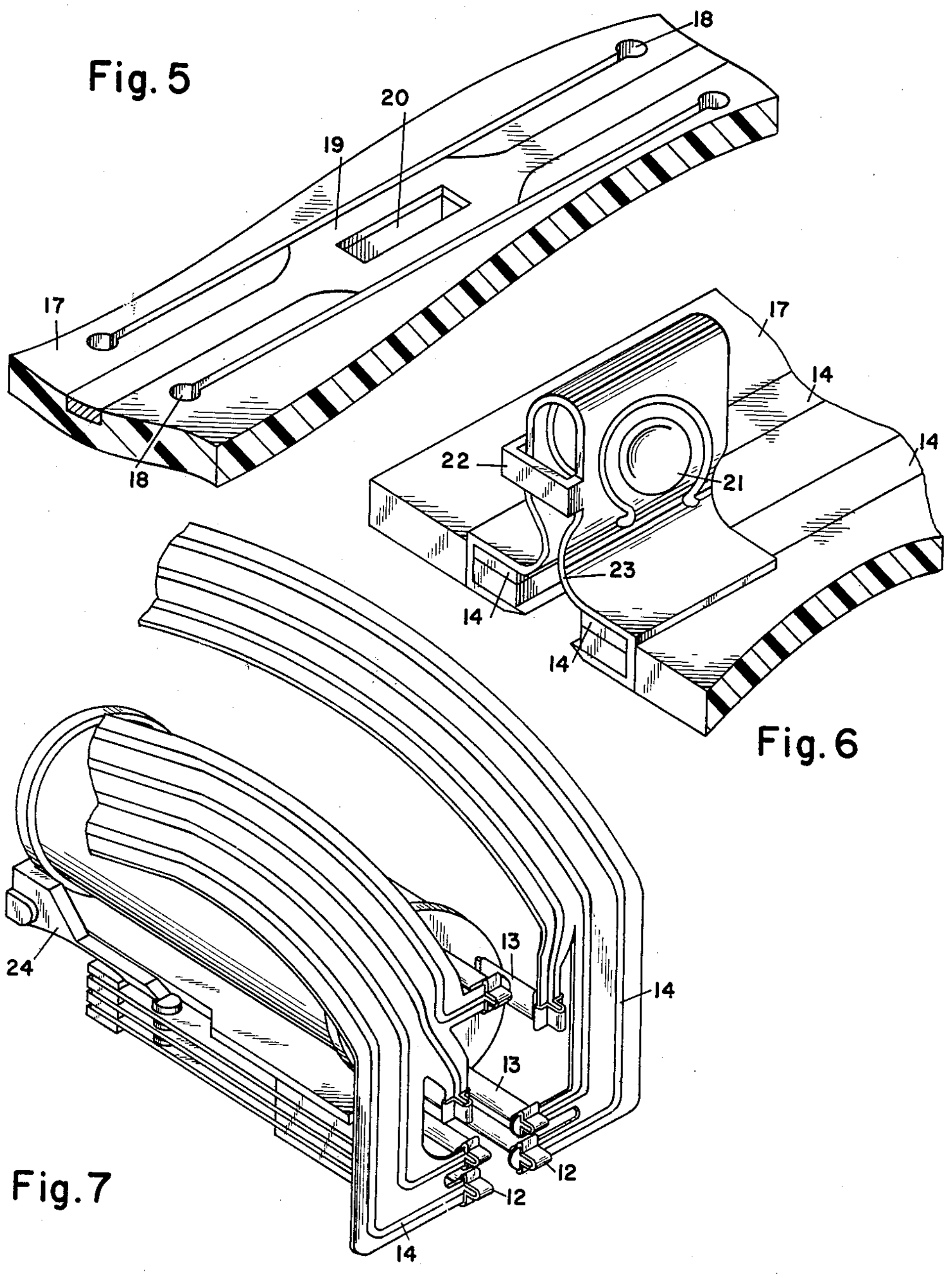
FIG. 5 is a perspective view of a modification of the embodiment of FIG. 2.
FIG. 6 is a perspective view of yet another embodiment of the present invention.
FIG. 7 is a perspective view of an embodiment of the connector of the present invention illustrating a typical use.

Since it is frequently desirable to make connections at points other than the conductor ends, a means such as that illustrated in FIG. 5 can be utilized to provide such a connection. In this figure there is shown a divided conductor 19 which has an aperture 20 therein adapted for receiving a male connector. The terminal 12 (not shown in this figure) is so inserted as to straddle the aperture 20 and receive a male connector inserted through the aperture 20.

Referring now to FIG. 6 there is here illustrated another embodiment of the present invention wherein the loop-shaped terminal is provided with a dimpled ear 21, and necked-down portion 23, and a reinforcing tang 22. The necked-down portion 23 and dimpled ear 21 provide a more secure frictional engagement of the loop-shaped terminal with, for example, a blade-type male connector. The tang 22 is provided to secure the loop portion against opening up or distending after repeated insertions of the male connector. The dimpled ear 21 may be provided on one or both sides of the loop portion and may appear either as dimples or completely cut out as illustrated. The cut out ears are somewhat preferable since they may be repeatedly bent in toward each other between removal and reinsertion of the male connector.

Illustrated in FIG. 7 is a telephone relay 24 having male blade-type terminals 13 thereon. A printed circuit cable having conductors 14 is illustrated attached to the relay 24 by means of the terminals 12 in the manner illustrated in FIGS. 2 and 3.

One of the unique features of the connector of the present invention is that it may be used either with solder or as a solderless plug-in type connector. When used as a soldered connector the terminal may be pre-tinned to provide a soldered connection by the application of heat thereto. A desirable attribute of the connector of the present invention is that it may be put in place and will remain mechanically secured while the soldering operation is being performed. An additional feature of this connector is that the terminal portion serves as a heat sink while unsoldering the connector from a terminal pin. Furthermore, the connector of the present invention allows many soldering and unsoldering operations with little or no damage to the conductor and terminal.

While applicant does not intend to be limited to the use of any particular materials in the manufacture of the connector of the present invention, it is particularly suited for use with flat, flexible printed circuit cables having planar, copper conductors with flexible plastic insulation. For example, in the illustration of FIG. 4, the conductor 14 may be two-ounce (0.0027 inch thick) copper $\frac{1}{10}$ inch wide. The bifurcated ends may be $\frac{1}{16}$ inch wide and have a separation of, for example, $\frac{1}{10}$ inch. The insulation 17 may be, for example, Kel-F having a thickness of ten mils. (0.010 inch). The loop-shaped terminal 12 may be made of Phosphor bronze. It may be formed from a long strip of sheet stock pressed in to shape in an intaglio mold to provide a single elongated loop-shaped member which may be laterally cut into a plurality of individual loop-shaped terminals. It is believed that this principle applies broadly to most plastics and metals and applicant does not intend to be limited to those cited in the above example.

The present invention presents an important step forward in the connector art in that the versatility of flexible printed circuit cables may be successfully utilized to achieve a heretofore unrealized result in the wiring and hook-up of electrical apparatus.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as for within the true spirit and scope of the invention.

What is claimed is:

1. An electrical connection for connecting a conductor to a conductor terminal comprising: an elongated planar flexible conductor, a plastic base, said conductor being bonded to said plastic base, and a loop-shaped conductive terminal connected to said conductor and said plastic base at the periphery of said elongated planar conductor, said loop-shaped conductive terminal having at least two separate areas of contact to said conductor at said conductor's periphery, engaging means on said terminal surrounding opposite edges of said conductor, a rigid conductor terminal, said conductor terminal located in a mating relationship with said loop's inner surface thereby establishing an electrical connection between said rigid conductor terminal and said flexible conductor on said plastic base.

2. An electrical connection for connecting a conductor to a conductor terminal comprising: an elongated flexible conductor having an opening therein transverse thereto, a plastic base, said conductor being bonded to said plastic base, and a loop-shaped conductive terminal connected to said conductor and said plastic base at the periphery of said conductor opening, said loop-shaped conductive terminal having at least two separate areas of contact to said conductor at said conductor opening periphery, engaging means on said terminal surrounding opposite edges of said conductor, a rigid conductor terminal, said conductor terminal located in a mating relationship with said loop's inner surface thereby establishing an electrical connection between said rigid conductor terminal and said flexible conductor on said plastic base.

3. An electrical connection for connecting a conductor to a conductor terminal comprising: an elongated flexible conductor having an opening therein transverse thereto, a plastic base, said conductor being bonded to said plastic base, and a loop-shaped conductive terminal connected to said conductor and said plastic base at the periphery of said conductor opening, said terminal having at least two separate areas of contact to said conductor at said conductor opening periphery, engaging means on said terminal surrounding opposite edges of said conductor, a rigid conductor terminal, said conductor terminal located in a mating relationship within said conductor opening and in contact with said loop's inner surface, thereby establishing an electrical connection between said rigid conductor terminal and said flexible conductor on said plastic base.

4. An electrical connection for connecting a bifurcated conductor to a conductor terminal comprising: an elongated flexible bifurcated conductor having two conductor branches mounted on a flexible plastic base and a loop-shaped conductive terminal connected to said bifurcated conductor branches and said plastic base, said loop-shaped conductive terminal having at least two separate areas of contact to said conductor branches, engaging means on said terminal surrounding opposite edges of each of the conductor branches, a rigid conductor terminal, said rigid conductor terminal located in a mating relationship between said bifurcated conductor portions and in contact with said loop's inner surface thereby establishing an electrical connection between said rigid conductor terminal and said flexible conductor on said plastic base.

5. The electrical connection of claim 1 wherein said looped-shaped conductive terminal has a tang extending from one side of said terminal loop across said loop and clinched around the opposite side of said loop to provide reinforcement against distention of said terminal from repeated usage.

6. The electrical connection of claim 1 wherein said loop-shaped conductive terminal has dimples laterally inward on opposite sides thereof to provide solderless contact with said rigid conductor terminal.

References Cited in the file of this patent

UNITED STATES PATENTS

| | | |
|---|---|---|
| 1,635,256 | Carter | July 12, 1927 |
| 2,516,572 | Heller | July 25, 1950 |
| 2,617,847 | Cole | Nov. 11, 1952 |
| 2,744,244 | Schumacher et al. | May 1, 1956 |
| 2,898,519 | Foster | Aug. 4, 1959 |
| 2,909,758 | Modrey | Oct. 20, 1959 |
| 2,980,878 | Swengel | Apr. 18, 1961 |

FOREIGN PATENTS

| | | |
|---|---|---|
| 519,491 | France | Jan. 26, 1921 |

OTHER REFERENCES

AMP, "Electronics," April 1, 1957, page 31.